United States Patent [19]

Hoodwin

[11] 4,274,281

[45] Jun. 23, 1981

[54] HYDRAULIC TESTING SYSTEM

[76] Inventor: Louis S. Hoodwin, Rte. 1, Box 246, Sawyer, Mich. 49125

[21] Appl. No.: 946,156

[22] Filed: Sep. 27, 1978

[51] Int. Cl.³ .......................................... G01M 13/02
[52] U.S. Cl. ..................................................... 73/118
[58] Field of Search ................ 60/424, 435, 437, 465, 60/476, 484; 74/720, 664; 180/44 M; 73/134, 133 R, 118

[56] References Cited

U.S. PATENT DOCUMENTS

| | | | |
|---|---|---|---|
| 1,642,095 | 9/1927 | Tracy | 73/134 |
| 2,336,911 | 12/1943 | Zimmerman | 60/437 X P |
| 3,050,993 | 8/1962 | Draughon et al. | 73/134 |
| 3,199,378 | 8/1965 | Badalini | 60/484 X P |
| 3,768,757 | 10/1973 | Eickmann | 60/424 X P |
| 4,019,404 | 4/1977 | Schauer | 60/437 X P |
| 4,037,409 | 7/1977 | Leibach | 60/435 X P |

*Primary Examiner*—Irwin C. Cohen

[57] ABSTRACT

This invention describes a hydraulic system for creating a testing or conditioning torque load on a power transmitting component. This system provides low energy dissipation, easily obtainable multiple speed ratio capability, fast response to changing load requirements, and the ability to couple easily to multiple power terminals.

1 Claim, 2 Drawing Figures

HYDRAULIC TESTING SYSTEM

The invention pertains to a hydraulic system which creates a torque load on a power transmitting component in order to test or condition the component. The objects of this invention are to provide a system which will create a torque load on a power transmitting component in such a way as to result in low energy dissipation, easily obtainable multiple speed ratio capability, fast response to changing load requirements, and simple coupling to multiple power terminals.

The power transmitting components to be loaded must have two or more coupling terminals, such as shafts, internally splined hubs, or flanges, through which the power is transmitted and to which the system described by this invention may be coupled. In many cases, a single power terminal may be either an input or an output terminal depending on operating conditions. For example, the shaft of an automobile transmission which is connected to the engine is an input shaft or an output shaft depending on whether the engine is delivering power to the wheels, as when the automobile is accelerating on level pavement, or the wheels are delivering power to the engine, as when the automobile is coasting. It is important for a loading system to be able to load in both directions, such as drive and coast loading of a transmission.

In the rest of this specification and the claims, the coupling terminals of a power transmitting component will be described as being on one power side (to differentiate from a physical side) of the component or the other power side, not as input and output terminals.

In some cases there are two or more coupling terminals on one power side of a component. For example, an automobile differential used in front engine rear drive power trains has a shaft on one power side connected to the transmission and two coupling terminals on the other power side that couple to the axles. It is also important that the loading system should be able to couple to multiple terminals easily.

Most previously used loading systems, including absorption and transmission dynamometers, must transmit considerable energy outside the system in order to create a load. Among these energy transmitting means are mechanical brakes, water brakes, eddy current brakes, and electric generators. For testing automatic transmissions, some dynamometers have been built using a flywheel, the inertia of which simulates the inertia of an automobile. During acceleration, the load on the transmission is proportional to the accelerations of the flywheel. In order to test at all operating speeds, the speed of the flywheel is very high at the end of the test. A brake must then be used to dissipate the energy in the flywheel in order to be able to repeat the test within a reasonable length of time.

All of the above described loading systems require the use of a rotary power source (motor, engine, etc.) that is capable of producing the full required torque on the component being tested. There is another loading system that overcomes the energy dissipation and the high power requirements of the above described systems. This is commonly known as the four-square or regenerative system. It uses a mechanical linkage which transmits rotary motion from a terminal on one power side of a component being tested to the other power side of the component. A displacement means is installed in the linkage which may be adjusted to supply a torque load in either direction. With this system, the motor does not have to maintain the torque that stresses the component. Therefore, the motor can be relatively small and economical.

The four-square system has some major drawbacks. It is often difficult and expensive to transmit rotary torque from one power side of the tested component to the other power side. Some systems use four right angle gear boxes to accomplish this. Also, if the component being tested has a difference in the speeds at its two power sides, suitable speed changing equipment must be used in the regenerative circuit. An automatically shifting transmission would be very difficult to test since a speed shifting unit in the regenerative circuit would have to be made to shift in exact synchronization with the transmission.

This invention is intended to retain the advantages of the four-square system and to overcome its disadvantages.

This invention used hydraulic pumps that may act as motors and hydraulic motors that may act as pumps. If a hydraulic unit mechanically coupled to one power side of a power transmitting component acts as a pump, a hydraulic unit mechanically coupled to the other power side of the component must act as a motor. The choice of location of a hydraulic unit of particular construction depends on economics and ease of control. Throughout the rest of this specification and the claims, the hydraulic units will be called pumps if they were originally designed to be used mainly as pumps (zero displacement capability, over center control, pressure regulation). The hydraulic units will be called motors if they were originally designed to be used mainly as motors (fixed displacement or a limited minimum displacement).

The details and functioning of this invention will be described with the aid of the accompanying drawing in which the figures are as follows.

Figure 1:
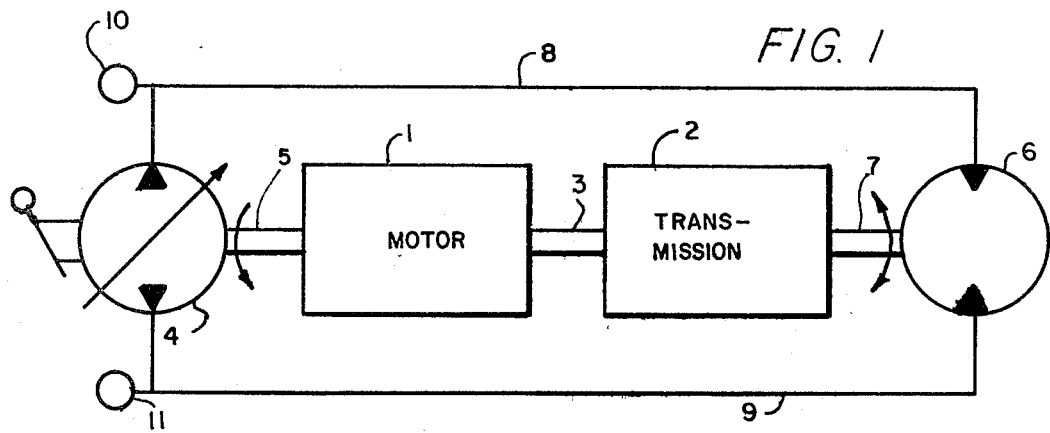
FIG. 1 is a schematic presentation of a testing system made in accordance with this invention in which the power transmitting component being tested is an automotive automatic transmission.

For simplification, hydraulic components, the methods of use of which are not unique to this invention, have been omitted from the drawing. These components include replenishing pumps, relief valves, case drains, sumps, filters, etc. Any skilled in the field of industrial hydraulic power transmission would know what is needed.

Referring to FIG. 1, a motor 1 is coupled to an automatic transmission 2 through a shaft 3. The motor 1 is also coupled to a variable displacement hydraulic piston pump 4 through a shaft 5. The pump 4 has an over center, manually operated pumping displacement control. The pump 4 is designed for use in closed loop hydrostatic transmission systems. In addition to being coupled to the pump 4 (through the motor 1), the transmission 2 is also coupled to a hydraulic piston motor 6 through a shaft 7. A hydraulic line 8 connects one of the ports of the pump 4 with one of the ports of the motor 6. Another hydraulic line 9 connects the other port of the pump 4 with the other port of the motor 6. Hydraulic pressure gauges 10 and 11 are installed in the lines 8 and 9. For ease in handling, flexible hose may be used in lines 8 and 9. The motor 1 could be mounted to one side and the system could be driven through a pulley and belt arrangement.

If the shaft 3 were removed, this system would be a common closed loop hydrostatic transmission system. In such a system, the pump 4 is designed so its control will move automatically to minimize the hydraulic pressure in the lines 8 and 9. When the pump 4 acts as a pump, hydraulic forces move its control toward the center, zero pumping displacement, position. When the pump 4 acts as a motor, hydraulic forces move its control toward a maximum displacement position.

With the shaft 3 in place, the control on the pump 4 still tends to move automatically to a position that results in minimum hydraulic pressure in the lines 8 and 9. This condition is realized when the pumping rate (rpm times the displacement per revolution) of the pump 4 is equal to the pumping rate of the motor 6. As the transmission 2 shifts from a low speed to a higher speed (decreasing gear ratio), the control on the pump 4 will automatically move to a position of higher displacement. If the transmission 2 is shifted into reverse, the control on the pump 4 will shift over center from the forward minumum pressure positions.

In order to create a torque load on the transmission 2, a differential pressure must be created in the lines 8 and 9. This is accomplished by applying a force to the control on the pump 4. If the force on the control tends to increase the displacement of the pump 4 (away from center), pressure in the outlet port line will increase and the pump 4 will acts as a pump while the motor 6 will act as a motor. If the force on the control tends to decrease the displacement of the pump 4 (toward center), pressure in the inlet port line will increase and the pump 4 will act as a motor and the motor 6 will act as a pump. The amount of torque on the transmission 2 is proportional to the force on the control on the pump 4. If pump 4 acts as a motor, the transmission is loaded in a simulated driving condition. If the pump 4 acts as a pump, the transmission 2 is loaded in a simulated coasting condition. The amount of torque may be determined by observing the pressure gauges 10 and 11. One gauge indicates driving torque and the other gauge indicates coasting torque. Only one line at a time is pressurized above replenishing pump pressure.

In place of the manually controlled pump 4, an electro-servo controlled pump may be used with inputs from differential pressure, speed, and acceleration transducers. Such a system can easily simulate the changing loads actually encountered by a transmission operating in an automobile on the road.

Even if the system in FIG. 1 is operating under high torque, very little energy is dissipated when compared to an absorption dynamometer. Therefore, the motor 1 can have relatively low power capacity. Since relatively small and simple movements of the control are required, the magnitude and direction of the torque may be changed in a fraction of a second.

Figure 2:
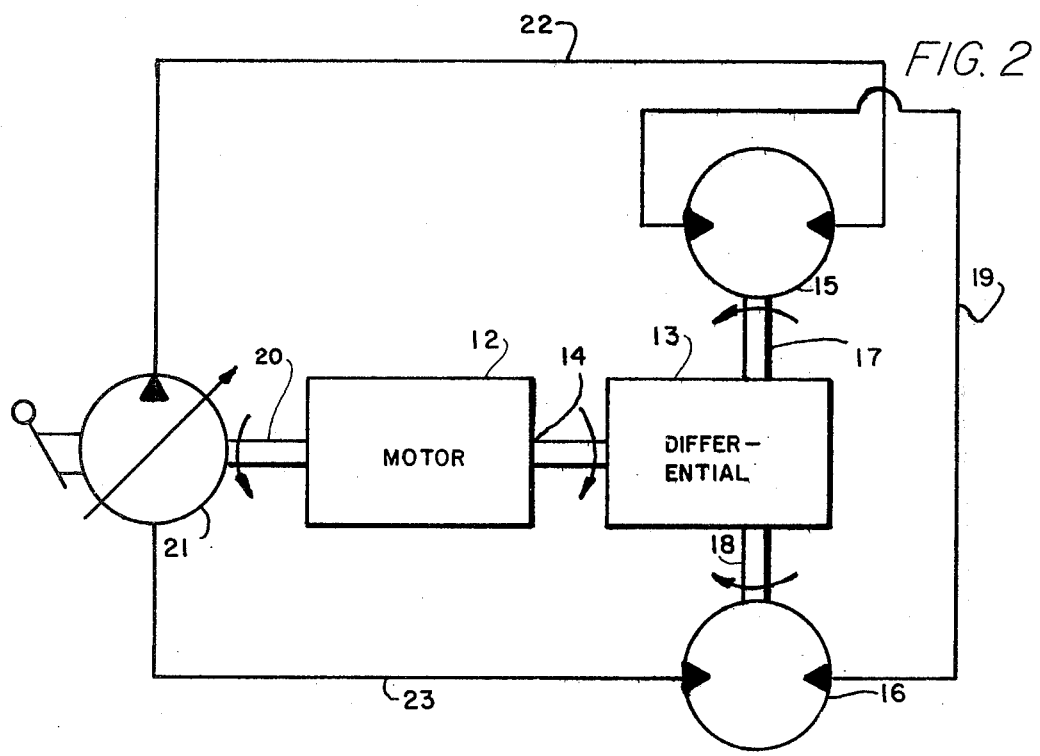
FIG. 2 is a schematic presentation of a testing system made in accordance with this invention in which the power transmitting component being tested is an automotive differential.

Referring to FIG. 2, a motor 12 is coupled to an automotive differential 13 through a shaft 14 which simulates the drive shaft of an automobile. The differential 13 is also coupled to two hydraulic motors 15 and 16 through two shafts 17 and 18 which simulate axles. The other side of the motor 12 is coupled through a shaft 20 to a hydraulic pump 21 with a one side of center control. This type of control may be used since the differential 13 cannot reverse. The hydraulic line 22 is connected from the outlet port of the pump 21 to a port on the motor 15 such that the motor 15 will rotate in the forward direction (referred to a vehicle) when the line 22 is carrying high pressure. A hydraulic line 19 connects motors 15 and 16 in series thus effectively locking the differential 13 to simulate running straight on a road. A hydraulic line 23 connects the motor 16 with the inlet port of the pump 21. Except for no reversal of rotation and no change in speed ratio, the operation of this system is similar to the operation of the system shown in FIG. 1.

I claim:

1. A hydraulic testing apparatus consisting of
   a power transmitting component on which a torque load is to be applied, said component having two or more rotary coupling terminals;
   a variable displacement hydraulic pump coupled mechanically to a terminal on one power side of the power transmitting component;
   a hydraulic motor or motors coupled mechanically to each terminal on the other power side of the power transmitting component;
   a closed hydraulic interconnecting system whereby the above hydraulic units are all fluid connected in series;
   a rotary power source with means to rotate the terminals of the power transmitting component;
   a means for varying the displacement of the pump thus creating a differential hydraulic pressure between the input and output sides of the pump and also creating a torque load on the power transmitting component, and
   a means for measuring the torque load.

* * * * *